(12) United States Patent
Chen et al.

(10) Patent No.: US 7,293,823 B2
(45) Date of Patent: Nov. 13, 2007

(54) INTERLOCKED PILLAR AND ROOF RAIL JOINT

(75) Inventors: Xiaoming Chen, Canton, MI (US); Omar Faruque, Ann Arbor, MI (US); Everett Kuo, Troy, MI (US); Thierry Guimberteau, Livonia, MI (US); Raj Mehta, Westland, MI (US); James Zimmerman, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 25 days.

(21) Appl. No.: 11/164,268

(22) Filed: Nov. 16, 2005

(65) Prior Publication Data

US 2007/0108803 A1   May 17, 2007

(51) Int. Cl.
*B62D 25/04* (2006.01)
(52) U.S. Cl. .................. 296/203.03; 296/193.06
(58) Field of Classification Search .......... 296/29, 296/30, 193.06, 203.03, 210, 56, 146.8, 203.04
See application file for complete search history.

(56) References Cited

U.S. PATENT DOCUMENTS

| | | | | |
|---|---|---|---|---|
| 1,237,902 A | * | 8/1917 | Healey | 296/210 |
| 1,388,250 A | * | 8/1921 | Godfrey | 296/203.01 |
| 1,602,913 A | * | 10/1926 | Leipert | 296/29 |
| 1,696,936 A | * | 1/1929 | Breneman | 49/400 |
| 3,328,935 A | * | 7/1967 | Peras | 52/630 |
| 3,776,589 A | * | 12/1973 | Barenyi et al. | 296/203.03 |
| 4,462,629 A | * | 7/1984 | Todori et al. | 296/30 |
| 4,634,173 A | * | 1/1987 | Aonuma et al. | 296/203.04 |
| 5,271,687 A | * | 12/1993 | Holka et al. | 403/233 |
| 5,603,581 A | * | 2/1997 | Fujita et al. | 403/272 |
| 5,715,643 A | * | 2/1998 | Parkinson | 52/656.9 |
| 5,716,155 A | | 2/1998 | Yoshida et al. | |
| 5,829,219 A | | 11/1998 | Sugawara et al. | |
| 5,873,618 A | * | 2/1999 | Ejima | 296/30 |
| 6,092,865 A | | 7/2000 | Jackel et al. | |
| 6,123,378 A | * | 9/2000 | Teply et al. | 296/29 |
| 6,241,310 B1 | * | 6/2001 | Patelczyk | 296/205 |
| 6,293,617 B1 | * | 9/2001 | Sukegawa | 296/203.03 |
| 6,328,376 B2 | * | 12/2001 | Son | 296/203.03 |
| 6,402,414 B1 | * | 6/2002 | Kanodia et al. | 403/230 |
| 6,478,367 B2 | * | 11/2002 | Ishikawa | 296/203.03 |
| 6,623,067 B2 | * | 9/2003 | Gabbianelli et al. | 296/205 |
| 6,641,207 B1 | * | 11/2003 | Passone | 296/187.12 |
| 6,688,674 B2 | | 2/2004 | Sato et al. | |
| 6,957,845 B2 | * | 10/2005 | Rager | 296/146.9 |

(Continued)

FOREIGN PATENT DOCUMENTS

DE    3540814 A1 *   5/1987   ............ 296/210

(Continued)

*Primary Examiner*—D. Glenn Dayoan
*Assistant Examiner*—Paul Chenevert
(74) *Attorney, Agent, or Firm*—Frederick Owens; Brooks Kushman P.C.

(57) ABSTRACT

A joint assembly for joining a tubular B-pillar to a tubular roof rail. The joint assembly includes an inner bracket plate and an outer bracket plate that are welded to each other around the roof rail and B-pillar. A flange of the roof rail is received in a slot formed in an upper end of the B-pillar.

14 Claims, 4 Drawing Sheets

U.S. PATENT DOCUMENTS

| | | | |
|---|---|---|---|
| 7,001,097 B2 * | 2/2006 | Wang et al. | 403/231 |
| 7,121,615 B2 * | 10/2006 | Hoshino | 296/203.03 |
| 2001/0000119 A1 * | 4/2001 | Jaekel et al. | 296/29 |
| 2003/0071489 A1 * | 4/2003 | Forssell | 296/203.03 |
| 2003/0141747 A1 * | 7/2003 | Honma et al. | 296/203.03 |
| 2004/0212222 A1 | 10/2004 | Katsuma | |
| 2005/0023865 A1 | 2/2005 | Rager | |

FOREIGN PATENT DOCUMENTS

| | | | | | |
|---|---|---|---|---|---|
| DE | 4014385 A1 | * | 11/1991 | | 296/29 |
| EP | 568251 A1 | * | 11/1993 | | 296/29 |
| FR | 2563173 A1 | * | 10/1985 | | 296/210 |
| JP | 02092785 A | * | 4/1990 | | 296/203.01 |
| JP | 02200580 A | * | 8/1990 | | 296/29 |
| JP | 02234885 A | * | 9/1990 | | 296/210 |
| JP | 04038277 A | * | 2/1992 | | 296/29 |
| JP | 05131953 A | * | 5/1993 | | 296/29 |
| JP | 06001262 A | * | 1/1994 | | 296/203.01 |
| JP | 2001106118 | | 4/2001 | | |
| JP | 2001328561 | | 11/2001 | | |
| JP | 2002114108 | | 4/2002 | | |

* cited by examiner

INTERLOCKED PILLAR AND ROOF RAIL JOINT

BACKGROUND OF THE INVENTION

1. Field of the Invention

The present invention relates to vehicle roof support structures.

2. Background Art

Vehicle roofs are supported by pillars that are generally referred to as A, B, and C pillars. Other parts of the support structure of a vehicle roof include roof rails that extend fore and aft on opposite lateral sides of the vehicle and roof bows that extend transversely between the roof rails. Vehicle roofs are supported on the pillars, roof rails and roof bows.

Roof rails and pillars of conventional construction generally include several sheet metal panels that are formed in a stamping process and assembled together with resistance, or spot welds. Conventional roof construction processes are labor intensive. Roofs formed by conventional construction techniques provide sufficient strength to meet the current standard FMVSS216 for "Roof Crush Resistance" that requires that the roof is of sufficient strength to withstand a load of 1.5 times the vehicle weight with less than 5 inches of deformation.

New standards have been proposed that require roof crush resistance of 2.5 times the unloaded vehicle weight. The new standards are being promulgated in an effort to further increase occupant protection. To meet or exceed the proposed standards with conventional roof construction techniques, considerably thicker and heavier sheet metal parts and reinforcements would be required. The increased part weight would adversely impact vehicle fuel economy. The use of larger parts and reinforcements tend to limit design freedom due to the need to provide more massive pillar designs.

The structure and strength of vehicle A-pillars, B-pillars and roof rails are key to satisfying the proposed new standards. The A-pillar/roof rail structure determines the initial resistance of the roof to crush loads. The B-pillar/roof rail structure is a key to meeting the peak load test specified in the new proposed standards. While the individual strength of the A-pillars, B-pillars and roof rails are a factor in roof crush resistance, strengthening these parts does not guarantee a strong roof structure. The strength of the joints between the A-pillars, B-pillars and roof rails is a major factor contributing to roof strength. The stiffness of the pillar/roof rail joints is also important in limiting joint deformation and increasing overall roof strength. Joint stiffness is also a factor in determining the static and dynamic stiffness of the vehicle body. Joint stiffness also affects noise, vibration and harshness (NVH) performance.

These and other problems associated with prior art vehicle roof support structures are addressed by applicants' invention as summarized below.

SUMMARY OF THE INVENTION

According to one aspect of the present invention a vehicle roof support is provided for joining a pillar to a roof rail. The top of the pillar defines at least one tubular cross-section with an upwardly oriented open end. The pillar has a cutout extending downwardly from the open end. A roof rail having a closed tubular cross-section and a downwardly extending flange is received in the cutout in the pillar. An inner bracket is secured to an inner lateral surface of the pillar and an inner lateral surface of the roof rail. An outer bracket is secured to the inner bracket, an outer lateral surface of the pillar, and an outer surface of the roof rail. Surface-to-surface contact is provided between the roof rail and pillar to assure direct load transfer.

According to another aspect of the invention, a roof for a vehicle is provided. A right roof rail and a left roof rail extend fore and aft on opposite sides of the roof panel. Roof rails are formed to have an elongated closed tubular shape. An A-pillar is provided that supports the forward end of each of the roof rails. A C-pillar is provided that supports the back end of each of the roof rails. A B-pillar supports an intermediate portion of the roof rails. The B-pillar is formed to have a vertically elongated tubular shape on at least the upper end of the pillar. The B-pillar is joined to the roof rail with the B-pillar engaging the roof rail in a T-joint. The B-pillar supports the roof rail that is oriented with the length of the roof rail being substantially perpendicular to the length of the B-pillar.

According to other aspects of the invention relating to the structure of the pillar, the top of the pillar may have a double tubular cross-section interconnected by a central channel. The double tubular cross-section may be in the form of a quadrilateral box section.

According to other aspects of the invention, the cutout extending downwardly from the open end may be a slot that is offset to one side of the central channel. Alternatively, the cutout extending downwardly from the open end may be a notch extending downwardly from the open end that is offset to one side of the central channel and is formed by removing the inner portion of the pillar to that point.

According to other aspects of the invention relating to the inner bracket, the inner bracket may have first and second weld flanges with the first weld flange extending in the forward vehicle direction from the pillar and a second weld flange extending rearwardly from the pillar.

According to other aspects of the invention relating to the outer bracket, the outer bracket may have fore and aft weld flanges extending fore and aft of the pillar and downwardly from the roof rail. The outer bracket may extend across the pillar over the roof rail and laterally inwardly from the roof rail to provide an attachment surface for the roof support bows.

These and other aspects of the invention will be better understood in view of the attached drawings and following detailed description of the illustrated embodiment.

DETAILED DESCRIPTION OF THE PREFERRED EMBODIMENT(S)

Figure 1:
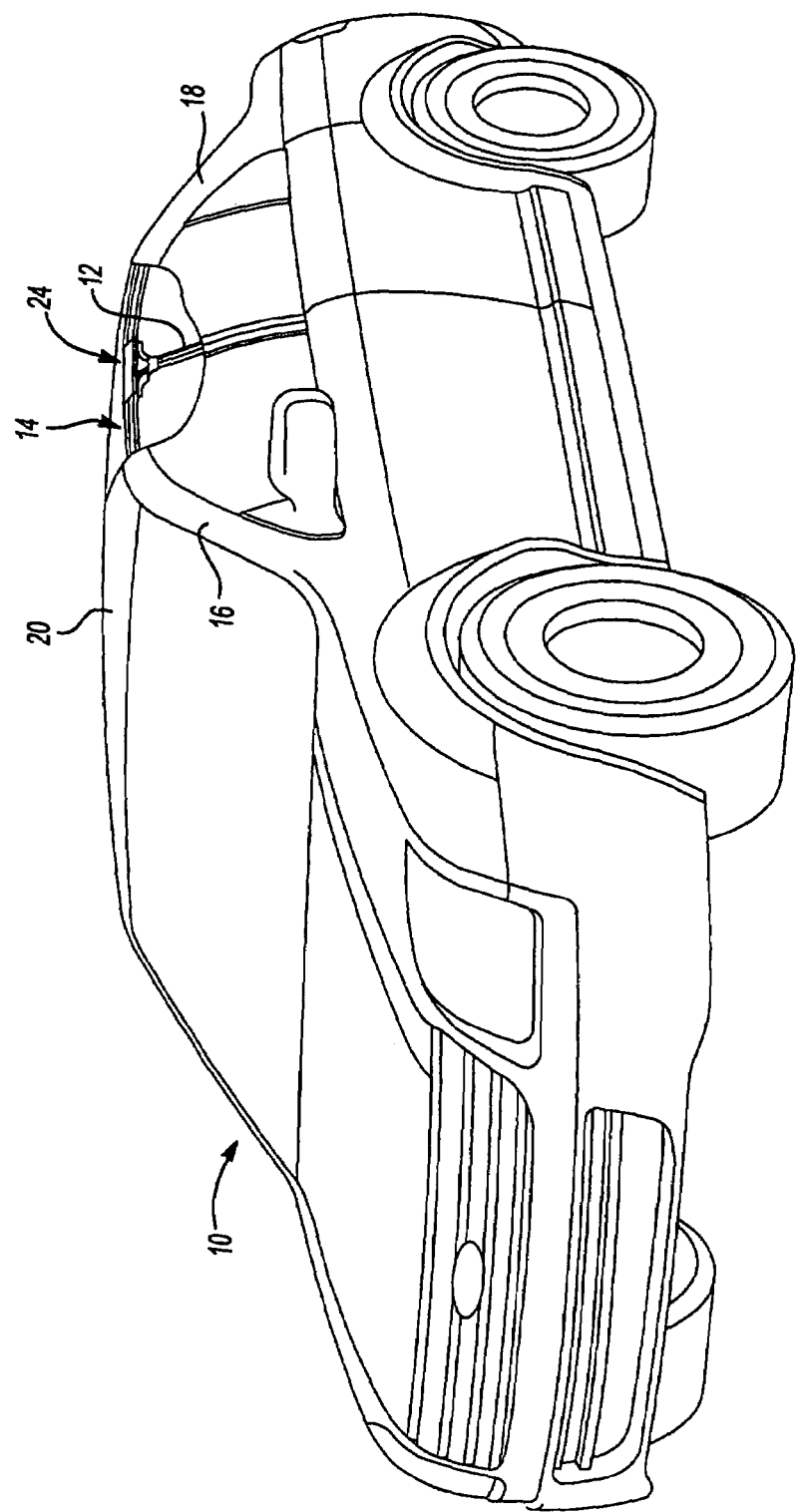
FIG. 1 is a front perspective view of a vehicle having a joint assembly made according to the present invention.

Referring to FIG. 1, a vehicle 10 is illustrated that has a B-pillar 12 and a roof rail 14 that are assembled together according to one embodiment of the present invention. The vehicle 10 also has an A-pillar 16 and a C-pillar 18 that together with the B-pillar 12 support a roof 20. The B-pillar 12 and roof rail 14 are assembled by a joint assembly 24 that will be more specifically described below.

Figure 2:
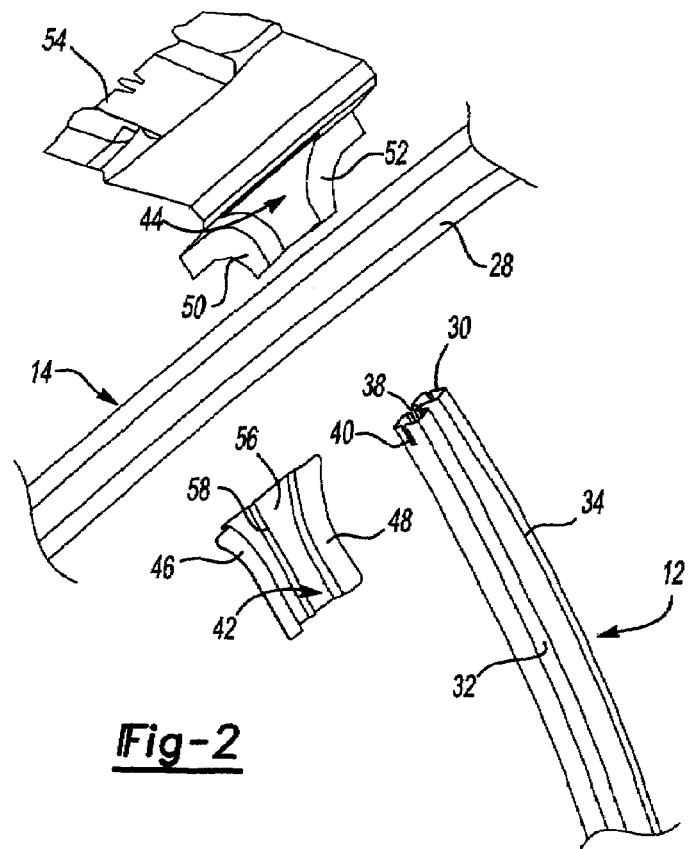
FIG. 2 is a fragmentary exploded perspective view of a pillar and a roof rail with the joint assembly of the present invention.
Figure 3:
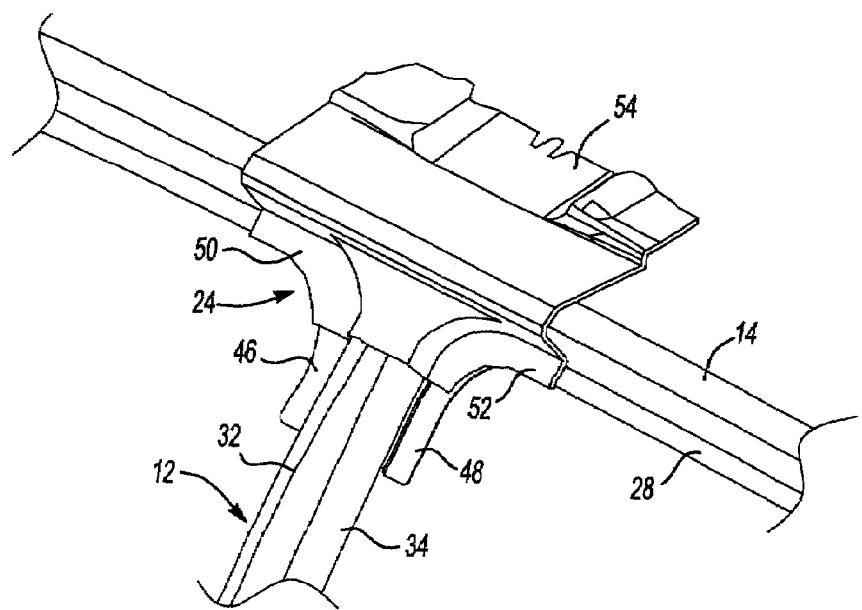
FIG. 3 is an outside fragmentary perspective view of the joint assembly that secures the pillar and roof rail together.
Figure 4:
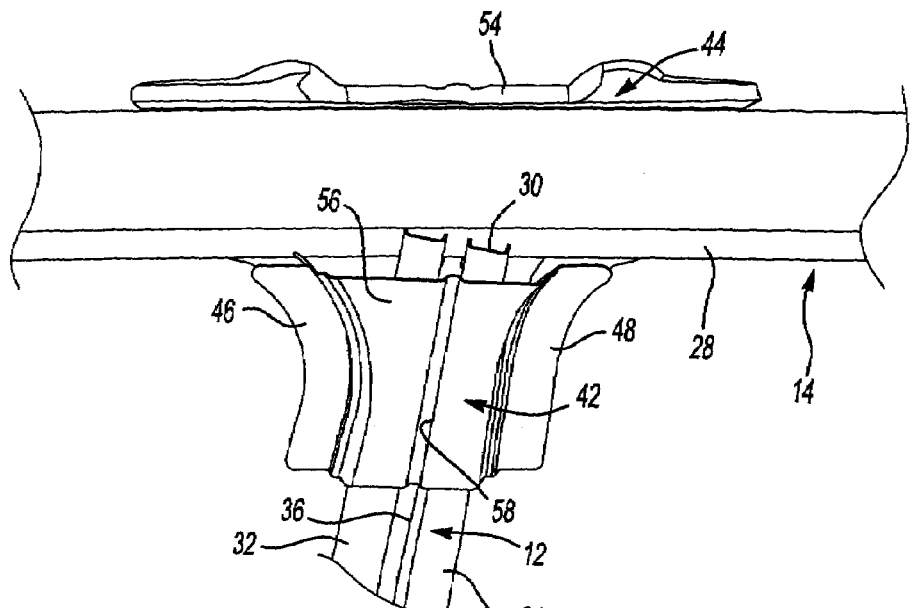
FIG. 4 is an inner fragmentary perspective view of the joint assembly that secures the pillar and roof rail together.

Referring to FIGS. 2-4, the joint assembly 24 illustrated in FIG. 1 is shown in greater detail. The joint assembly 24 joins the roof rail 14 to the B-pillar 12. The roof rail 14 has a flange 28 extending downwardly from the roof rail 14 that is received by an upper end 30 of the B-pillar 12. The B-pillar 12 includes a front box section 32 and a rear box section 34. The references to front and rear refer to vehicle orientation directions. A central portion is formed as oppositely oriented channels 36 and 38 between the front and rear box sections 32, 34. A slot 40 is formed in the upper end 30 of the B-pillar 12. Slot 40 is offset laterally inwardly relative to the channel 36.

An inner bracket plate 42 and an outer bracket plate 44 are secured around opposite sides of the B-pillar 12 and roof rail 14. A first weld flange 46 is formed on the inner bracket 42 adjacent the front box section 32. A second weld flange 48 is formed on the inner bracket 42 adjacent the rear box section 34. An arcuate fore weld flange 50 and an arcuate aft weld flange 52 are formed as part of the outer bracket 44. The outer bracket plate 44 also includes roof attachment structure 54. Roof attachment structure 54 may be configured to receive roof bows or a roof inner panel depending on the design of the roof 20.

A pillar receptacle portion 56 of the inner bracket 42 receives the inner side of the upper end 30 of the B-pillar 12. A groove 58 is provided in the pillar receptacle portion 56 of the inner bracket 42 that is received in the channel 36 of the B-pillar 12.

Figure 5:
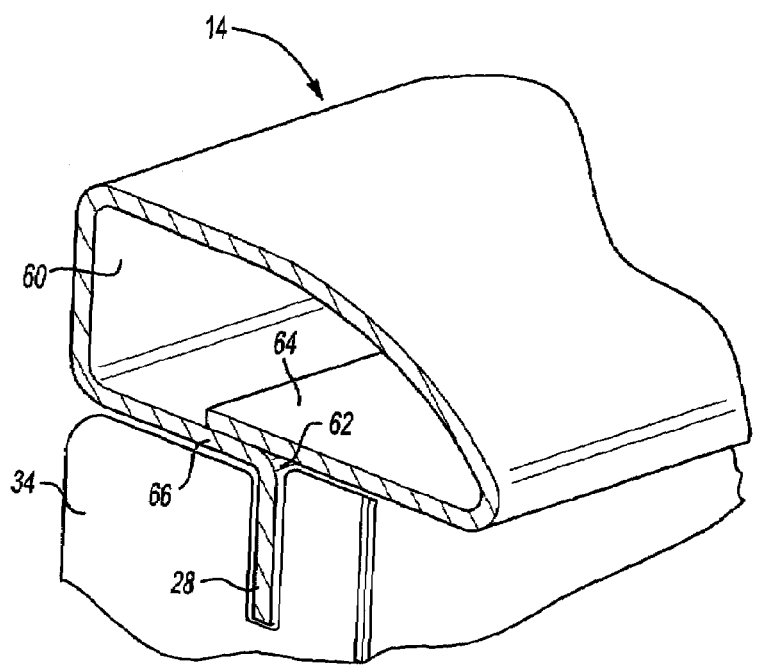
FIG. 5 is a cross-sectional view of a roof rail made in accordance with the present invention.

Referring to FIG. 5, the roof rail 14 is shown to include a tubular body portion 60. The tubular body portion is formed by a roll forming process and is then welded together in a lap weld area 62. Lap weld area 62 is formed by overlapping an end flange 64 and a flange base 66 of the roof rail 14. The end flange 64 is placed over the flange base 66 and welded together in the lap weld area 62. The flange 28 of the roof rail 14 is received in the slot 40 formed in the upper end 30 of the B-pillar 12. The upper end 30 of the B-pillar 12 may be spaced from the tubular body portion 60 of the roof rail 14 to accommodate assembly tolerances without compromising roof strength and the integrity of the joint assembly 24.

Figure 6:
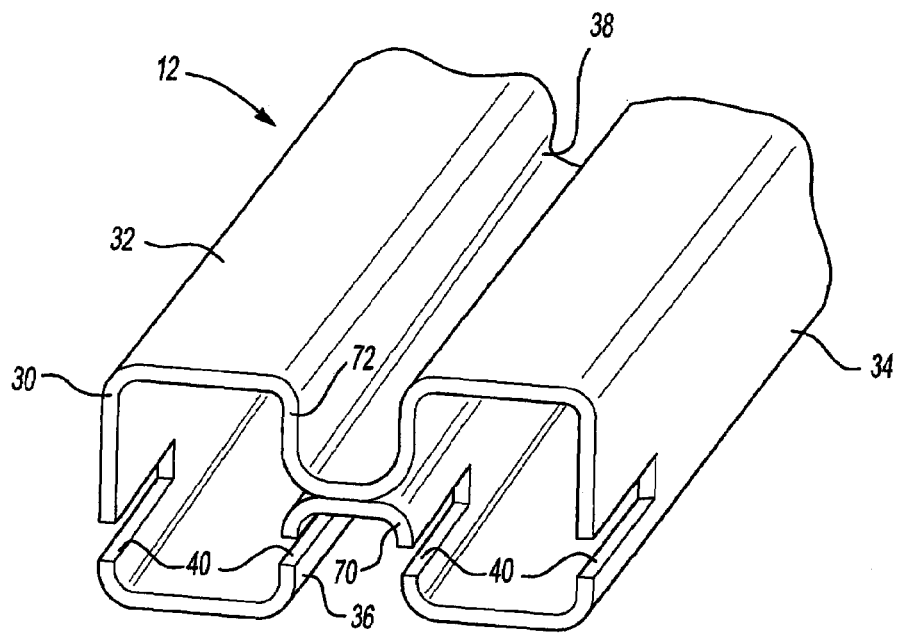
FIG. 6 is a fragmentary perspective view of an upper end of the pillar.

Referring to FIG. 6, the upper end 30 of the B-pillar 12 is shown. The B-pillar 12 includes a front box section 32 and a rear box section 34 that are separated by the channels 36, 38. The channels 36, 38 are formed by an inner roll formed groove 70 and an outer roll formed groove 72 that are formed into an abutting relationship and define the channels 36, 38. A slot 40 extends through the upper end 30 of the B-pillar 12. The slot 40 is adapted to receive the flange 28 of the roof rail 14. The slot 40 constrains movement of the roof rail 14 relative to the B-pillar 12 to establish surface-to-surface contact between the two tubular components that allows direct load transfer from the roof rail 14 to the B-pillar 12. The B-pillar 12 and roof rail 14 are permanently assembled together as described above with reference to FIGS. 2-4.

Figure 7:
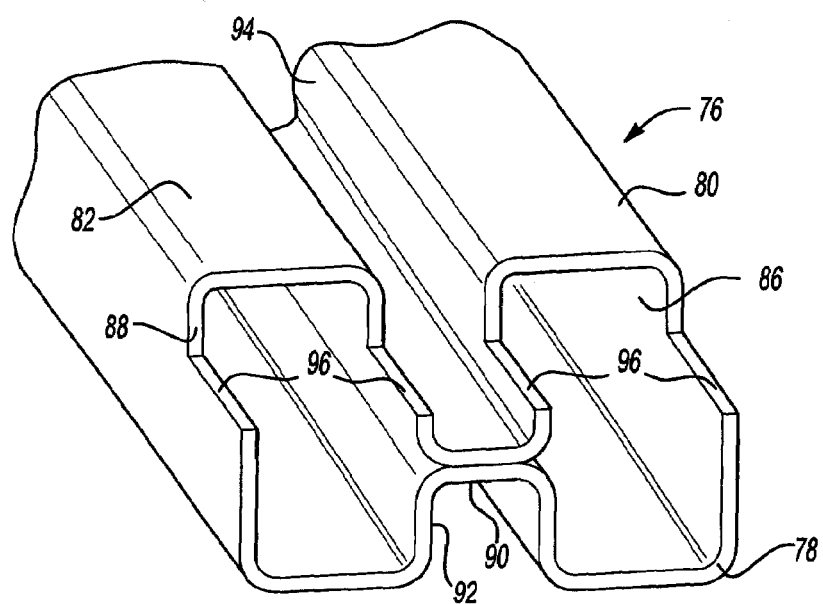
FIG. 7 is a fragmentary perspective view of an upper end of an alternative embodiment of a pillar.

Referring to FIG. 7, an alternative construction B-pillar 76 is partially illustrated at its upper end 78. The alternative B-pillar 76 includes a front box section 80 and a rear box section 82. The front box section 80 has a notch 86, while the rear box section 82 has a notch 88. Notches 86 and 88 are provided to receive the flange 28 of the roof rail 14. A central channel 90 is provided in the B-pillar 76. The notches 86 and 88 are formed by removing a portion of the upper end 78 that is inboard relative to the central channel 90. The central channel 90 is formed by an inwardly extending roll formed groove 92 and an oppositely oriented outwardly extending roll formed groove 94. The flange 28 is received on edge surfaces 96 that are exposed when the notches 86, 88 are formed in the upper end 78 of the B-pillar 76. The notches 86 and 88 in the illustrated embodiment are offset inwardly relative to the central channel 90 but could be provided at a location outboard relative to the central channel 90, if desired.

Fabrication of the joint assembly 24 will be described with reference to FIGS. 2-4. The B-pillar 12 is formed in a roll forming operation or by hydro-forming. Front box section 32, rear box section 34 and central channel 36 are formed in the roll forming or hydro-forming operation. The roof rail 14 is formed in a separate roll forming or hydro-forming operation. The flange 28 of the roof rail 14 is inserted into the slot 40 formed in the upper end 30 of the B-pillar 12. The roof rail 14 is further formed by Mig welding the end flange 64 to the flange base 66. The slot 40 may be formed by mechanically cutting, laser cutting or water jet cutting the upper end 30 of the B-pillar 12. No weld is required between the flange 28 and the slot 40 because the inner bracket plate 42 and outer bracket plate 44 envelop the roof rail 14 and upper end 30 of the B-pillar 12. The inner bracket plate 42 is Mig welded to the inside of the B-pillar 12 near the upper end 30 thereof. The weld flanges 46 and 48 of the inner bracket plate 42 are spot welded to the arcuate fore and aft weld flanges 50 and 52 of the outer bracket plate 44. The inner bracket plate 42 and the outer bracket plate 44 are welded to an outer body panel (not shown) that covers the B-pillar 12.

The joint assembly 24 provides excellent joint stiffness that is intended to improve noise, vibration and harshness performance of the vehicle roof. The increased joint stiffness also provides a strong joint between the roll formed, or hydro-formed, roof rail and roll formed, or hydro-formed, B-pillar. The joint assembly 24 does not require welding the tubular B-pillar 12 to the tubular roof rail 14. By avoiding welding the two tubes together, the structural strength of the tubes is not compromised. This assures the strength of the joint assembly 24 in the event that the roof 20 is loaded with a compressive force. The load applied to the roof 20 is transferred from the roof rail 14 to the B-pillar 12 maximizing the load carrying capacity of the joint assembly 24.

While the best mode for carrying out the invention has been described in detail, those familiar with the art to which this invention relates will recognize various alternative designs and embodiments for practicing the invention as defined by the following claims.

What is claimed is:

1. A vehicle roof support comprising:
   a pillar having two tubular portions with two upwardly oriented open ends, the pillar also having a connecting central channel formed by the connection of two oppositely oriented inwardly extending grooves disposed between the two tubular portions, the pillar also defining a cut out extending downwardly from the open end;

a roof rail having a closed tubular cross-section and a downwardly extending flange that is received in the cut out;

an inner bracket secured to an inner lateral surface of the pillar and an inner lateral surface of the roof rail;

an outer bracket secured to the inner bracket, an outer lateral surface of the pillar, an outer lateral surface of the roof rail and an upper surface of the roof rail; and whereby surface-to-surface contact is provided to assure direct load transfer from the roof rail to the pillar.

2. The vehicle roof support of claim 1 wherein the two closed tubular portions and the central channel are a unitary member.

3. The vehicle roof support of claim 1 wherein the tubular portions each have a quadrilateral box section.

4. The vehicle roof support of claim 1 wherein the cut out extending downwardly from the open end is a slot that is offset to one side of the central channel.

5. The vehicle roof support of claim 1 wherein the cut out extending downwardly from the open end is a notch that is formed by removing an inner portion of the end of the pillar up to a point that is offset from one side of the central channel.

6. The vehicle roof support of claim 1 wherein the inner bracket has first and second weld flanges with the first weld flange extending in the forward vehicle direction from the pillar and the second weld flange extending rearwardly from the pillar.

7. The vehicle support of claim 1 wherein the outer bracket has fore and aft weld flanges extending fore and aft of the pillar and extending downwardly from the roof rail.

8. A roof for a vehicle comprising:

a roof panel;

a right roof rail and a left roof rail extending fore and aft on opposite sides of the roof panel, the roof rails being formed in an elongated closed tubular shape;

an A-pillar supporting the forward end of each of the roof rails;

a B-pillar supporting an intermediate portion of the roof rails, the B-pillar being formed to have two vertically elongated closed tubular portions on at least the upper end thereof that are separated by a connecting channel portion formed by the connection of two oppositely oriented inwardly extending grooves, the channel portion being disposed between the tubular portions;

a C-pillar supporting the back end of each of the roof rails;

an inner bracket secured to an inner lateral surface of each of the B-pillars and an inner lateral surface of each of the roof rails; and an outer bracket secured to each of the inner brackets, an outer lateral surface of each of the B-pillars, an outer lateral surface of each of the roof rails and an upper surface of each of the roof rails; and wherein each of the B-pillars is joined to one of the roof rails with the B-pillars engaging the roof rails in a T-joint connection with each of the B-pillars supporting one of the roof rails that are oriented with the length of the roof rails being substantially perpendicular to the length of the B-pillars.

9. The roof for a vehicle of claim 8 wherein a cut out extending downwardly from the open end is a slot that is offset to one side of the channel portion.

10. The roof for a vehicle of claim 8 wherein the inner bracket has first and second weld flanges with the first weld flange extending in the forward vehicle direction from the pillar and the second weld flange extending rearwardly from the B-pillar.

11. The roof for a vehicle of claim 8 wherein the outer bracket has fore and aft weld flanges extending fore and aft of the B-pillar and extending downwardly from the roof rail.

12. The roof for a vehicle of claim 8 wherein the tubular portions and channel portion are formed by a single wall.

13. The roof for a vehicle of claim 12 wherein the tubular portions each have a quadrilateral box section.

14. The vehicle roof support of claim 12 wherein a cut out extending downwardly from the open end is a notch that is formed by removing an inner portion of the end of the B-pillar up to a point that is offset from one side of the channel portion.

* * * * *